US012306818B1

(12) United States Patent
Hungund et al.

(10) Patent No.: US 12,306,818 B1
(45) Date of Patent: May 20, 2025

(54) UNIFIED PERSISTENCE OVERALL FEATURE

(71) Applicant: SAP SE, Walldorf (DE)

(72) Inventors: Janardhan Hungund, Pune (IN); Amit Pathak, Pune (IN); Amit Saonerker, Pune (IN); Deepak Shrivastava, Pune (IN); Souvik Pal, Bengaluru (IN); Sebastian Seifert, Heidelberg (DE); Robert Schulze, Walldorf (DE); Mihnea Andrei, Issy les Moulineaux (FR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/515,731

(22) Filed: Nov. 21, 2023

(51) Int. Cl.
*G06F 16/22* (2019.01)
*G06F 16/23* (2019.01)

(52) U.S. Cl.
CPC .......... *G06F 16/2291* (2019.01); *G06F 16/23* (2019.01)

(58) Field of Classification Search
CPC .............................. G06F 16/2291; G06F 16/23
USPC ......................................................... 707/812
See application file for complete search history.

(56) References Cited

U.S. PATENT DOCUMENTS

| | | | | |
|---|---|---|---|---|
| 7,434,156 B1* | 10/2008 | Leong | ................... | G06F 16/289 717/114 |
| 10,311,048 B2 | 6/2019 | Wein | | |
| 2005/0091228 A1* | 4/2005 | Venkatesh | ............. | G06F 9/4493 |
| 2017/0147618 A1* | 5/2017 | Geissinger | ............. | G06F 16/25 |
| 2018/0150499 A1* | 5/2018 | Lee | ...................... | G06F 11/2038 |
| 2019/0354615 A1* | 11/2019 | Scheuer | .............. | G06F 16/2343 |
| 2020/0110765 A1* | 4/2020 | Smiley | .................. | G06F 16/282 |
| 2020/0301901 A1* | 9/2020 | Hao | ...................... | G06F 16/2264 |
| 2020/0387486 A1* | 12/2020 | Shrivastava | .......... | G06F 3/0604 |
| 2020/0387509 A1* | 12/2020 | Florendo | .............. | G06F 3/0604 |

(Continued)

FOREIGN PATENT DOCUMENTS

WO    WO-0025213 A1 *  5/2000  .......... G06F 11/1474

OTHER PUBLICATIONS

Sherkat et al., "Native Store Extension for SAP HANA", Proceedings of the VLDB Endowment, vol. 12, No. 12, 2019, pp. 2047-2058. (Year: 2019).*

(Continued)

*Primary Examiner* — Phuong Thao Cao
(74) *Attorney, Agent, or Firm* — Mintz Levin Cohn Ferris Glovsky and Popeo, P.C.

(57) ABSTRACT

A database system detects an operation to move a first database object from an in-memory store to a persistence store, wherein the first database object is in either a page-loadable or column-loadable format in the in-memory store, and wherein the first database object comprises a plurality of subcomponents. Each subcomponent of the first database object is examined separately from other subcomponents of the plurality of subcomponents. In response to determining that a first subcomponent of the plurality of subcomponents has a datatype and a compression type supported by a unified persistence format, the first subcomponent is stored in a unified persistence format in the persistence store. In response to determining that a second subcomponent of the plurality of subcomponents has either a datatype or a compression type which is not supported by the unified persistence format, the second subcomponent is stored in a serial persistence format in the persistence store.

20 Claims, 11 Drawing Sheets

(56) References Cited

U.S. PATENT DOCUMENTS

| | | | | |
|---|---|---|---|---|
| 2020/0387511 A1* | 12/2020 | Sherkat | ............... | G06F 12/0246 |
| 2021/0034598 A1* | 2/2021 | Arye | ..................... | G06F 16/288 |
| 2021/0311922 A1* | 10/2021 | Basak | ................. | G06F 16/2282 |
| 2021/0311923 A1* | 10/2021 | Gohad | ................. | G06F 12/0882 |
| 2021/0311949 A1* | 10/2021 | Basak | ................. | G06F 16/2282 |
| 2022/0027354 A1 | 1/2022 | Florendo et al. | | |

OTHER PUBLICATIONS

Extended European Search Report issued in European Application No. 24209234.4-1203 mailed Feb. 26, 2025, 12 Pages.

* cited by examiner

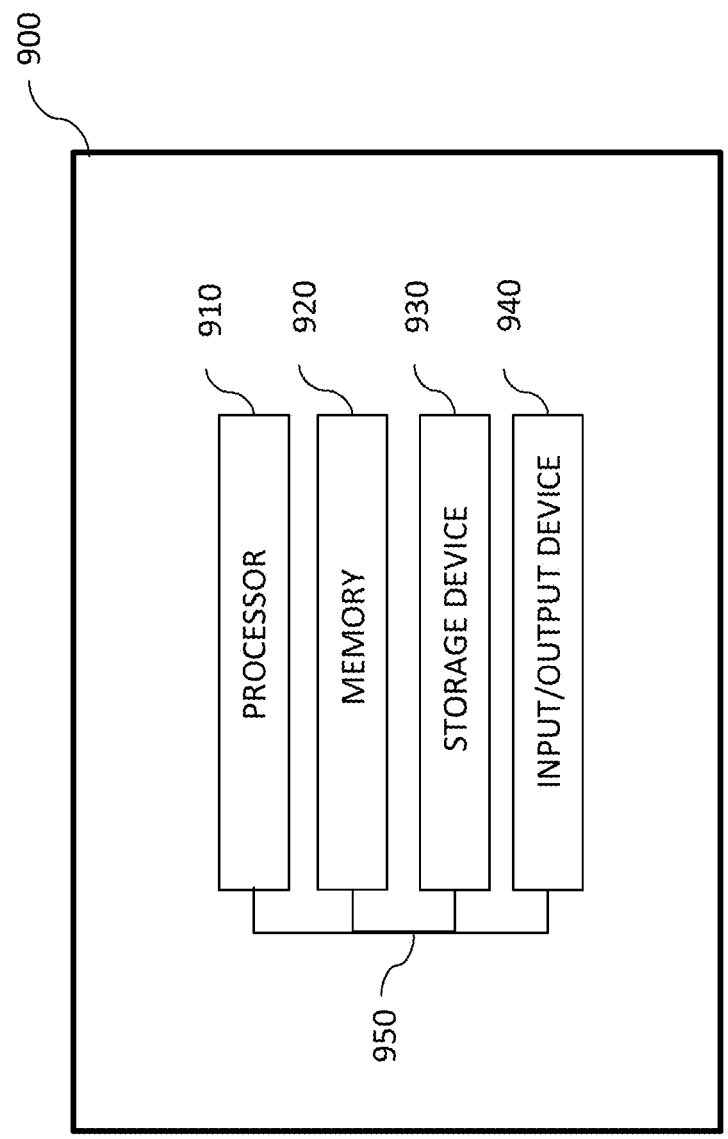

UNIFIED PERSISTENCE OVERALL FEATURE

TECHNICAL FIELD

The present disclosure generally relates to database processing.

BACKGROUND

A database is an organized collection of data. A database typically organizes data to correspond to how the data is logically arranged. This facilitates operations on the data, for example, looking up values in a database, adding data to the database, sorting the data in the database, or summarizing relevant data in the database. A database management system ("DBMS") mediates interactions between a database, users and applications in order to organize, create, update, capture, analyze and otherwise manage the data in the database.

In order to efficiently handle queries, databases are typically configured to perform in-memory operations on data. In an in-memory database, data needed to execute and respond to a query is loaded into memory, and the query is executed against that in-memory data. However, many applications have large data stores, and loading all of the required data into memory for these applications may be difficult due to memory limitations. The amount of data being processed by database systems continues to increase faster than memory devices are evolving to store more data.

SUMMARY

In some implementations, a database system detects an operation to move a first database object from an in-memory store to a persistence store, wherein the first database object is in either a page-loadable or column-loadable format in the in-memory store, and wherein the first database object comprises a plurality of subcomponents. Each subcomponent of the first database object is examined separately from other subcomponents of the plurality of subcomponents. In response to determining that a first subcomponent of the plurality of subcomponents has a datatype and a compression type supported by a unified persistence format, the first subcomponent is stored in a unified persistence format in the persistence store. When stored in the unified persistence format, database objects and/or their subcomponents may be loaded to the in-memory store in either the column-loadable format or the page-loadable format without causing a rewrite of their persistence. In response to determining that a second subcomponent of the plurality of subcomponents has either a datatype or a compression type which is not supported by the unified persistence format, the second subcomponent is stored in a serial persistence format in the persistence store.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations.

In the drawings,

FIG. 9A depicts an example of a system, in accordance with some example implementations of the current subject matter;

DETAILED DESCRIPTION

Figure 1:
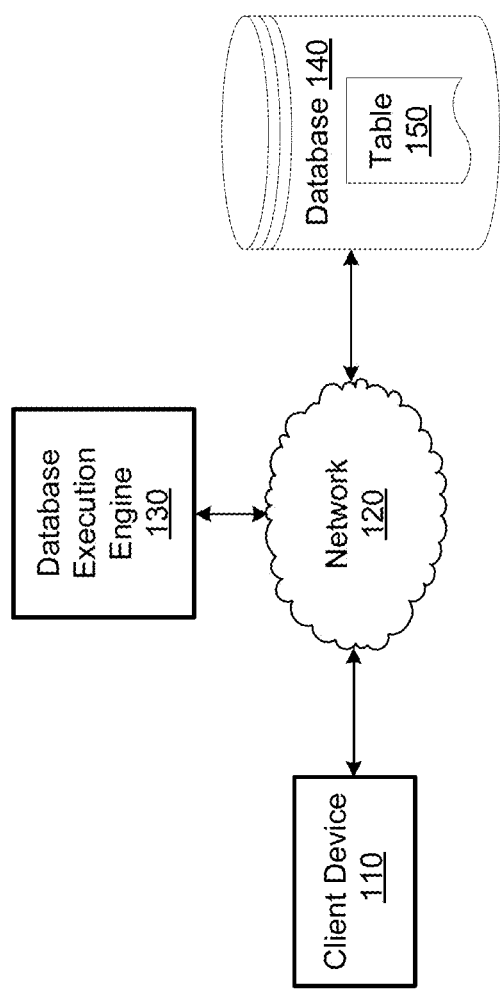
FIG. 1 illustrates an example of a database system, in accordance with some example implementations of the current subject matter.

Data structures are commonly created and populated in memory, and once populated, data structures may be persisted in persistence storage. Once in persistence storage, a data structure may be removed from memory when not needed. Then, if the data structure is again needed in memory at a future time, the data structure can be reconstructed from the information persisted in persistence storage. Loading a data structure refers to the reconstruction of the data structure in memory from the information persisted in the persistence storage. The representation of the data structure in a persistence store may not match the representation in memory, but the information stored in persistence storage is sufficient to allow for full reconstruction of the data structure in memory.

In some embodiments, when bringing data structures such as database objects from persistence store locations to in-memory locations, databases can bring the database objects into memory using multiple different formats. For example, one format is referred to as a column-loadable format. For the column-loadable format, the entire column is fully loaded into memory when the column is being queried. Fully loading the entire column into memory means bringing the entirety of the column's data, dictionary, and index into memory. Another type of format that can be employed is referred to as a page-loadable format. For the page-loadable format, only the pages which contain part of the column relevant to the query are loaded into memory. In other embodiments, other types of formats may be employed. It is noted that the terms "format", "load unit", and "load unit definition" may be used interchangeably herein.

While the format or load unit specifies how a column should be loaded into memory, the format does not necessarily determine how the column should be persisted. In a typical database deployment, the column-loadable format and page-loadable format load units use different persistence based on their load unit definition. For example, a column-loadable column has traditionally been persisted by serializing the column's data, dictionary, and index in a single page chain. For page-loadable columns, these columns have traditionally been persisted using a paging scheme such that the page containing the required column portion for the query is easily identifiable and can be brought into memory for access. For a page-loadable column, a separate page chain is persisted for each of the column's data, dictionary, and index subcomponents.

In some embodiments, the techniques disclosed herein involve using a single unified persistence format for storing database objects in persistence storage independent of their load unit definition. The unified persistence format allows each database object to be loaded into memory in column-loadable format or page-loadable format from the same persistence.

In some embodiments, when bringing database objects from persistence store locations to in-memory locations, databases can determine whether to load database objects in a column-loadable format or in a page-loadable format depending on the current workload, a corresponding attribute, and/or one or more other operating conditions. In some cases, storing the database objects in the column-loadable format is preferable, while in other cases, it is preferred to store the database objects in the page-loadable format. The mechanisms and data layout for storing database objects in column-loadable format differ from the configuration for storing database objects in the page-loadable format. Therefore, switching between the two configurations has traditionally required a full rewrite of the data persistence. The rewrite results in the consumption of considerable memory and processing resources. Accordingly, for traditional databases, switching between in-memory formats can be expensive in terms of memory and processing resources utilized due to the necessary rewrites. Therefore, improved techniques are desired that do not require persistence store rewrites for converted load units.

In an example, if the given database object has a column-loadable load unit, and the processing logic decides not to convert the load unit, then the given database object is loaded into the in-memory store in the column-loadable format. When loading a column into the in-memory store in the column-loadable format, the processing logic loads the entire column into the in-memory store. If the given database object has a page-loadable load unit, and the processing logic decides not to convert the load unit, then the given database object is loaded into the in-memory store in the page-loadable format. For the page-loadable format, the processing logic loads only the relevant pages into the in-memory store.

In an example, less frequently used tables are brought into memory in a page-loadable format, even those tables having a column-loadable load unit. For these less frequently used tables, only the relevant pages are brought into memory for the query being executed. In some embodiments, more frequently used tables are brought into memory in column-loadable format, even those tables having a page-loadable load unit. For these more frequently used tables, the entire column is brought into memory. In some embodiments, when storing to the persistence store from the in-memory store, the processing logic stores database objects into the single unified persistence format regardless of their in-memory format. The unified persistence format includes a separate composite page chain for the data, dictionary, and index vectors. A composite page chain may have one or more sub-page chains. The unified persistence format allows for fully in-memory data structures as well as page-by-page columnar data access.

The database may store each database object as a plurality of substructures that collectively forms and represents the database object. It is noted that the terms "substructure" and "subcomponent" may be used interchangeably herein. For a column, the substructures may include a dictionary, a data vector, and an index. The dictionary may associate each unique data value with a corresponding value identifier (ID). The value IDs may be numbered sequentially.

The data vector may include value IDs that map to the actual values of the database object. The index may include a sequential listing of each unique value ID and one or more positions in the data vector containing the value ID.

Referring now to FIG. 1, a system diagram illustrating an example of a database system 100 is depicted, in accordance with some example embodiments. In FIG. 1, the database system 100 may include one or more client devices 110, a database execution engine 130, and one or more databases 140. It is noted that the terms "database execution engine", "processor", and "processing logic" may be used interchangeably herein. Database 140 is shown as including table 150, which is representative of any number and type of database objects stored by database 140.

The one or more client devices 110, the database execution engine 130, and the one or more databases 140 may be communicative coupled via a network 120. The one or more databases 140 may include a variety of relational databases including, for example, an in-memory database, a column-based database, a row-based database, and/or the like. The one or more client devices 110 may include processor-based devices including, for example, a mobile device, a wearable apparatus, a personal computer, a workstation, an Internet-of-Things (IoT) appliance, and/or the like. The network 120 may be a wired network and/or wireless network including, for example, a public land mobile network (PLMN), a local area network (LAN), a virtual local area network (VLAN), a wide area network (WAN), the Internet, and/or the like.

Figure 2:
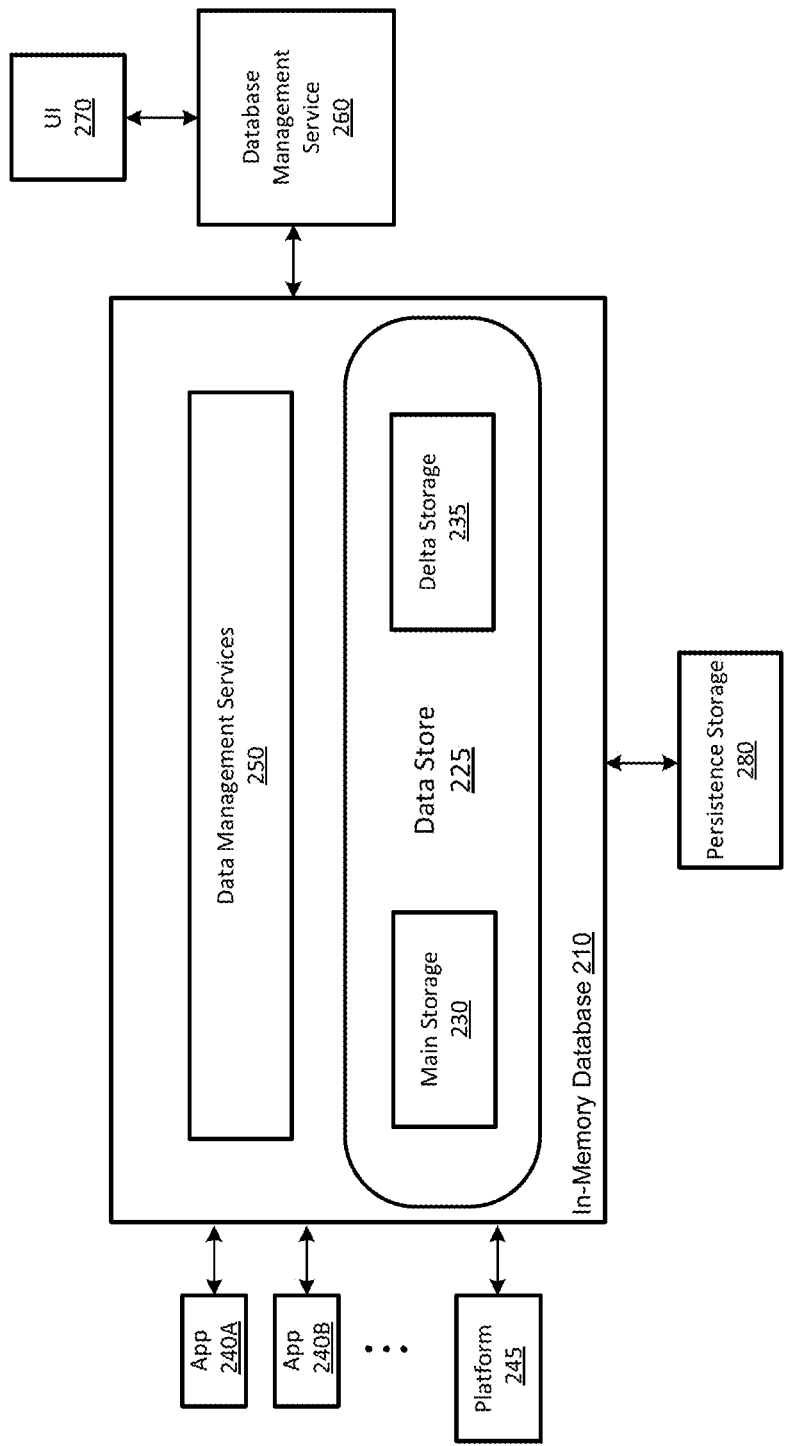
FIG. 2 illustrates another example of a system, in accordance with some example implementations of the current subject matter.

Turning now to FIG. 2, a diagram is depicted illustrating an example of a system 200 consistent with implementations of the current subject matter. System 200 includes applications 240A-B which interact with in-memory database 210. Applications 240A-B are representative of any number and type of applications executing within system 200. For example, applications 240A-N can include analytical services, transaction processing service, reporting services, dashboard services, and the like. Applications 240A-N interact with database 210 using structure queries or other expressions. System 200 also includes one or more platforms 245. In some embodiments, a given platform 245 can be a data warehousing service that exposes online analysis processing (OLAP) services to a user or application. The database management service 260 provides administration services and access to settings of the in-memory database 210. The user interface (UI) 270 mediates interactions between the database management service 260 and a user or application, for example, to configure the in-memory database 210 or set user preferences for sort operations.

Within the in-memory database 210, the data management services 250 manage transactions with the main storage 230 and the delta storage 235. The data management services 250 can provide a calculation and planning engine, modeling services, real-time replication services, data integration services, and/or other services. The main storage 230 supports fast read access to data of the database 210 in data store 225. A read operation accesses both the main storage 230 and delta storage 235, which includes any recently changed data that has not yet been incorporated into the main storage 230. The data in the main storage 230 may be backed up to persistence storage 280. Persistence storage 280 may be disk storage or other suitable type of memory device. The change data in the delta storage 235 is also backed up to persistence storage 280, so that changes survive events such as database failures, downtimes, and so on. In some embodiments, the persistence storage 280 stores database objects in a single, unified persistence format regardless of the load unit of the objects. The unified persistence format will be described in more detail throughout the remainder of this disclosure. It should be understood that the example architecture of system 200 is merely indicative of what may be employed in some embodiments. In other embodiments, system 200 may be structured in other suitable manners with other arrangements of components.

Figure 3:
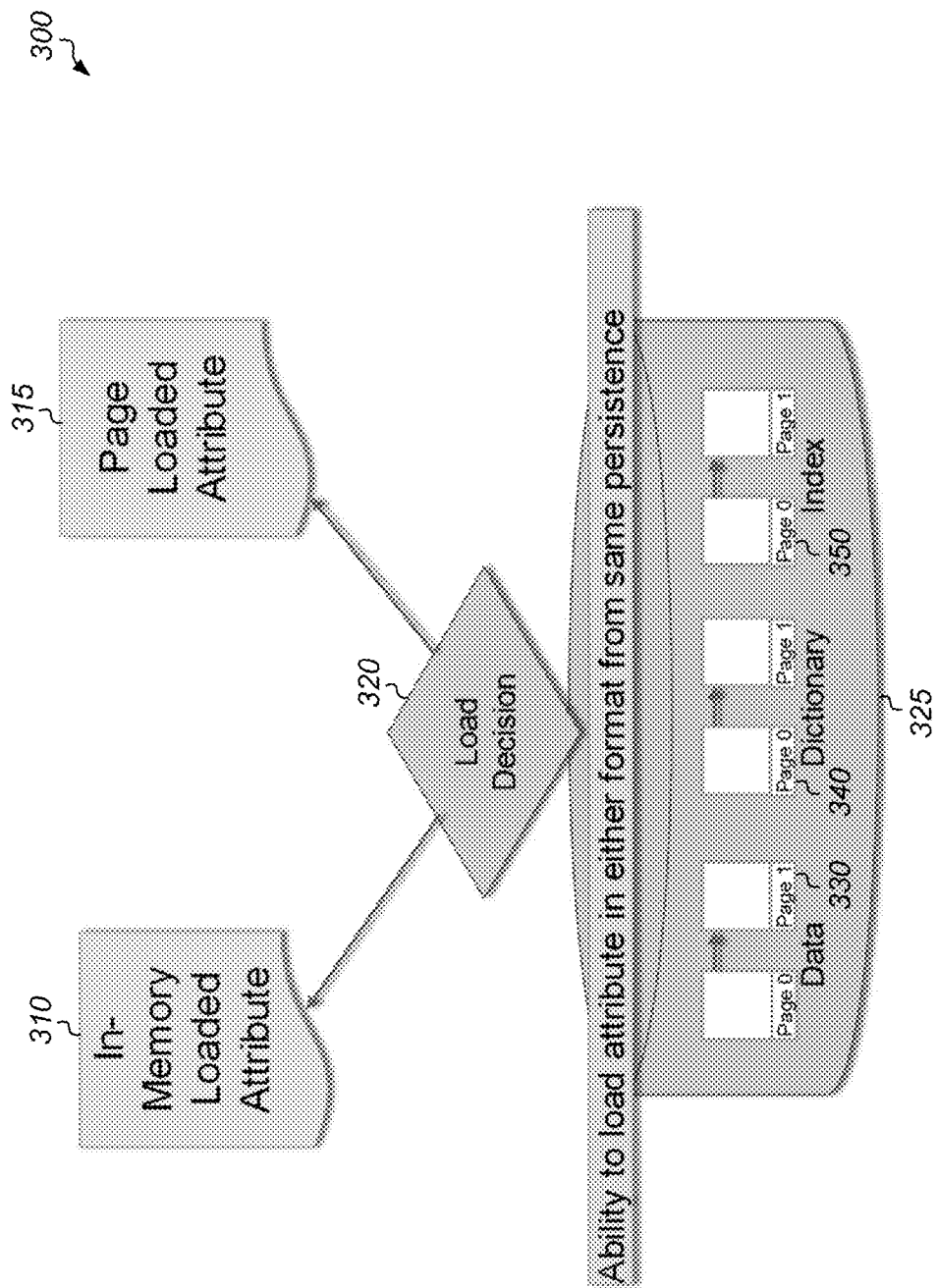
FIG. 3 illustrates an example of a system for implementing a load unit decision, in accordance with some example implementations of the current subject matter.

Referring now to FIG. 3, an example of a system 300 for implementing a load unit decision is shown. When a table is persisted into persistence store 325 using the unified persistence format, the table has separate page chains for the data, dictionary, and index subcomponents. These are shown as the data page chain 330, dictionary page chain 340, and index page chain 350. When loading a portion of a table into memory from persistence store 325, a load unit decision 320 is made dynamically regarding the intended structure of the table in the in-memory store. If the load unit decision 320 is to use page loaded attribute 315 (i.e., a page-loadable load unit), then the table will be loaded into memory using the page-loadable format. The page-loadable format has a separate page chain for the data, dictionary, and index parts of the table. By having separate page chains for the data, dictionary, and index parts of the table, just the relevant pages can be loaded into memory rather than the entire column. If the load unit decision is to use in-memory loaded attribute 310, then the table will be loaded into memory using the column-loadable load unit, also referred to as in-memory loaded format or column-loadable format.

When the table is loaded into memory using the column-loadable format 310, then the entirety of the data is read from persistence store 325, and the index vector, dictionary, and inverted index vector are created as in-memory structures. Once the data has been read from the persistence store 325 and the in-memory structures have been created, then the corresponding pages from the persistence store 325 are not accessed anymore. Using the in-memory index vector, a particular offset can be directly accessed in the in-memory store.

When the column of table is loaded into memory using the page-loadable format, then only the relevant data is read from persistence store 325 and loaded into memory. In an example, in the page-loadable format, the processor first calculates in which page the offset lies, then that page is loaded, and then data is read from that page. Within that page, additional calculations may be needed from the header to get to the specific offset of a particular row.

Figure 4:
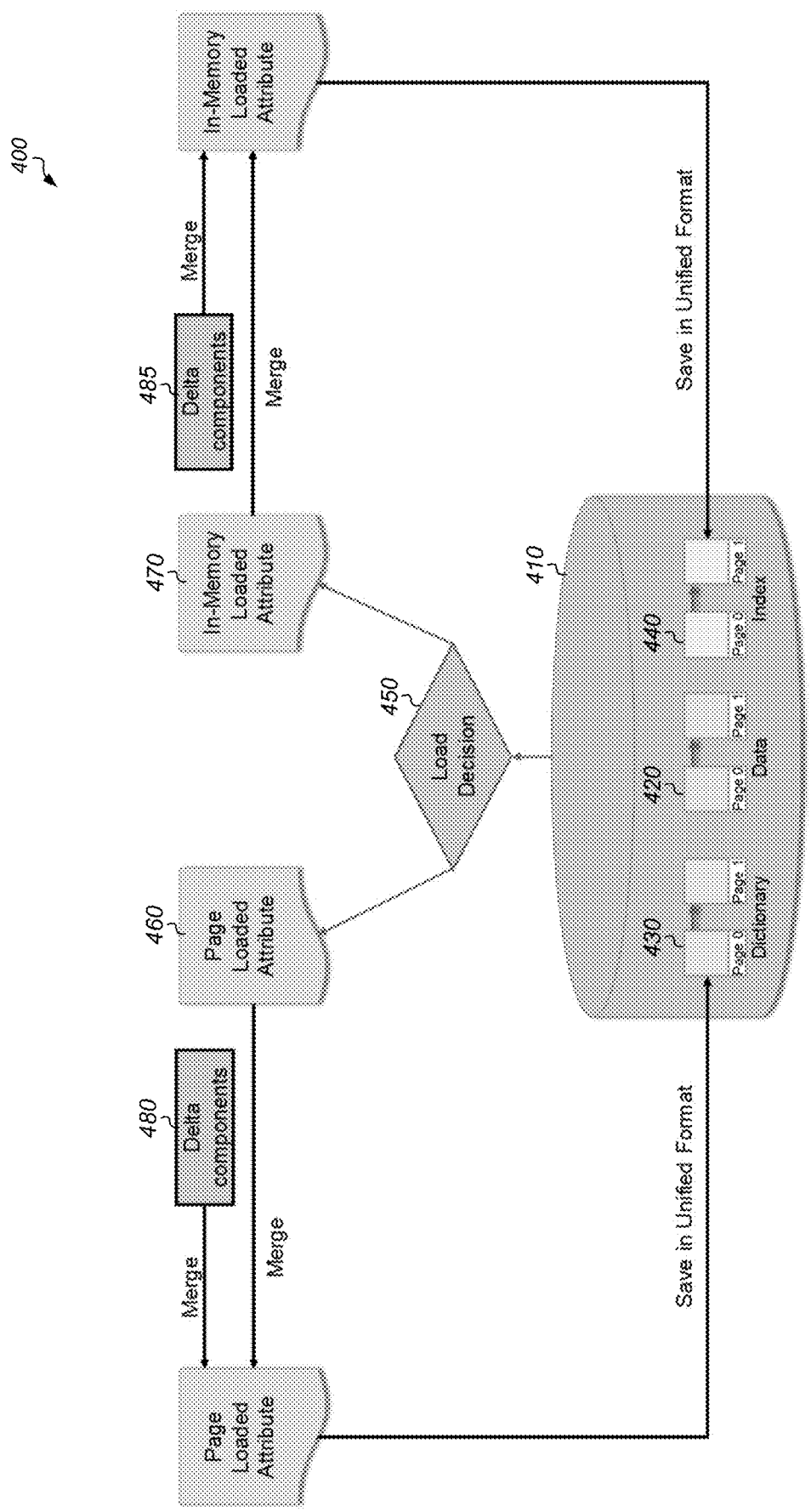
FIG. 4 illustrates an example of a system for performing one or more of the techniques described herein, in accordance with some example implementations of the current subject matter.

Turning now to FIG. 4, an example of a system 400 for performing one or more of the techniques described herein is shown. As shown, system 400 includes persistence store 410 which stores data in a unified persistence format. For tables stored in the unified persistence format, each component of the table has a separate page chain. For example, the data component is stored as data page chain 420, the dictionary component is stored as dictionary page chain 430, and the index component is stored as index page chain 440.

When a given portion of the table needs to be loaded into the in-memory store from persistence store 410, a load decision 450 will be made to determine in what format the given portion will be stored in memory. In an example, the determination of which format to load the given portion in-memory is based at least on an attribute associated with the table portion. For example, the attribute may be a page-loaded attribute 460 or the attribute may be an in-memory loaded attribute 470. In another example, the determination of which format to load the given portion in-memory is also based on real-time operating conditions (e.g., memory utilization, how frequently the table is accessed). If the real-time operation conditions indicate that a format conversion should not be performed, based on memory utilization, frequency of access, and other factors, then the load decision 450 can default back to the attribute associated with the table. For queries referencing a column with a page-loaded attribute 460, if a format conversion is not implemented, then the data is loaded into memory in the page-loadable format. For queries referencing a column with an in-memory loaded attribute 470, if a format conversion is not implemented, then the data is loaded into memory in the column-loadable format.

If a format conversion is implemented, then a column with a page-loaded attribute 460 is loaded in column-loadable format into the in-memory store. Or, if the column has an in-memory loaded attribute 470 and a format conversion is implemented, then the column is loaded in page-loadable format into the in-memory store. The format conversion may be implemented if memory utilization is below a threshold by converting a page-loadable load unit into a column-loadable load unit. Alternatively, or additionally, the format conversion may be implemented if memory utilization is above a threshold by converting a column-loadable load unit into a page-loadable load unit. Alternatively, or additionally, the format conversion may be implemented if the access frequency of the column is above a threshold by converting a page-loadable load unit into a column-loadable load unit. Alternatively, or additionally, the format conversion may be implemented if the access frequency of the column is below a threshold by converting a column-loadable load unit into a page-loadable load unit. Other conditions for performing a format conversion are possible and are contemplated.

Once a table is loaded into the in-memory store, when changes are made to the table in the page-loadable format, the delta components 480 are merged with the unchanged data and saved back into persistence store 410 in the unified persistence format. Similarly, when changes are made to a table in the column-loadable format in the in-memory store, the delta components 485 are merged with the unchanged data and saved back into persistence store 410 in the unified persistence format. In other words, in this example, regardless of which load unit is used for loading a table into memory, the changed data will be merged back and stored in the unified persistence format in persistence store 410.

Figure 5:
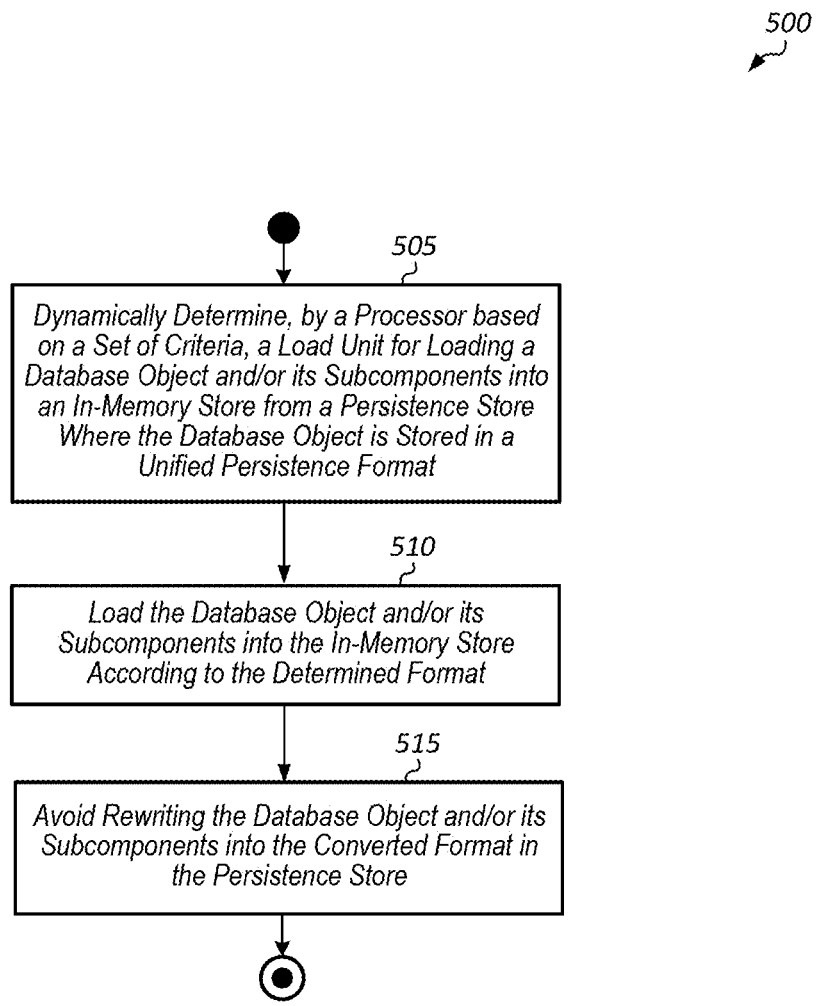
FIG. 5 illustrates an example of a process for dynamically determining load units for bringing database objects and/or database objects subcomponents into memory, in accordance with some example implementations of the current subject matter.

Referring now to FIG. 5, a process is depicted for dynamically determining load units for bringing database objects and/or database object subcomponents into memory. A processor dynamically determines, based on a set of criteria, a load unit for loading a database object (e.g., a database column) and/or subcomponents (e.g., data vector, dictionary, index) of the database object into an in-memory store from a persistence store where the database object is stored in a unified persistence format (block 505). In other words, the processor dynamically determines to the load unit at runtime in block 505. In an example, the load unit of the database object may be specified according to a data description language (DDL) statement associated with the database object. If the DDL statement specifies a first type of load unit for the database object, then in this example, the processor would dynamically determine whether to use the first type of load unit for the database object or whether to convert the first type of load unit to a second type of load unit different from the first type of load unit in block 505.

Depending on the embodiment, the set of criteria can include various parameters such as a load unit definition, application usage of the data, memory utilization, frequency of usage of the data, and so on. One or more of the parameters may take precedence or have more weight in some embodiments. For example, if a first condition is met, such as the memory utilization being above a first threshold, then the conversion may take place. In another example, if two conditions are met, such as the aforementioned first condition and a second condition of the frequency of access to the data being below a second threshold, then the conversion may take place. Alternatives with other numbers and types of conditions are possible and are contemplated. In other embodiments, each parameter factors in equally, or substantially equally, with the other parameters in the determination of which load unit to use for loading the database object and/or its subcomponents.

In response to dynamically determining the load unit for bringing the database objects and/or its subcomponents into memory, the processor loads the database object and/or its subcomponents into the in-memory store according to the determined format (block 510). Also, since the database object is stored in the unified persistence format in the persistence store, the processor avoids rewriting the database object and/or its subcomponents in the persistence store (block 515). In other words, in block 515, the persistence store copy of the database object can remain the same, avoiding a time-consuming rewrite of the data, which is especially advantageous for database objects of relatively large size. After block 515, method 500 ends.

Figure 6:
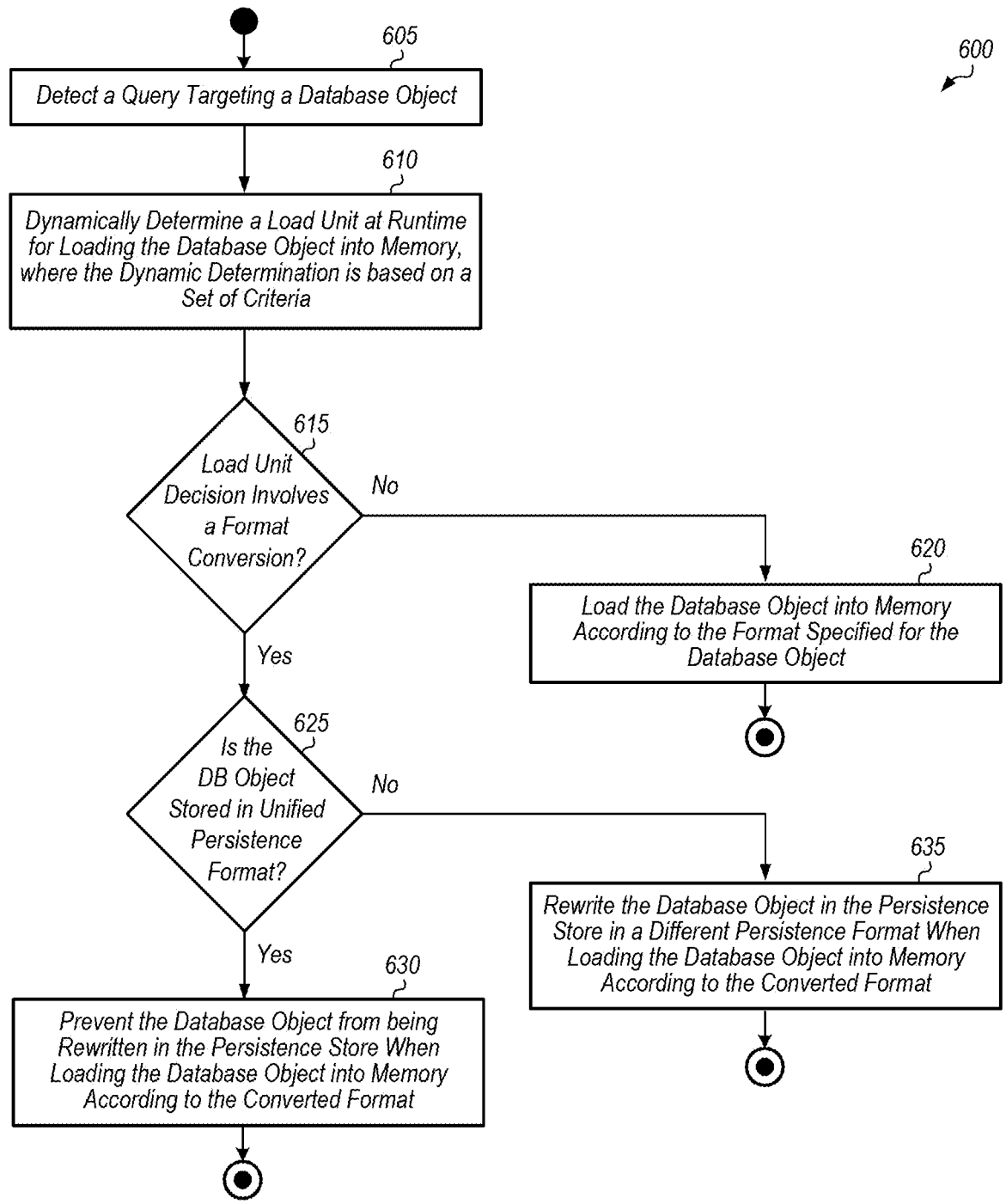
FIG. 6 illustrates an example of a process for dynamically making a load unit decision at runtime, in accordance with some example implementations of the current subject matter.

Turning now to FIG. 6, a flow diagram illustrating a process for dynamically making a load unit decision at runtime is shown. A processor detects a query targeting a database object (block 605). The processor dynamically determines a load unit at runtime for loading the database object into memory, where the dynamic determination is based on a set of criteria (block 610). In various embodiments, the set of criteria may include workload statistics, application usage of the database object, access frequency, memory utilization, size of the database object, size of each subcomponent, and/or other criteria. If the load unit decision involves a format conversion (i.e., converting a first format to a second format) (conditional block 615, "yes" leg), and if the database (DB) object is stored in the unified persistence format in a persistence store (conditional block 625, "yes" leg), then the processor prevents the database object in the persistence store from being rewritten when loading the database object into memory according to the converted format (block 630). In other words, the database object formatted according to the unified persistence format in the persistence store remains unchanged in block 630. After block 630, method 600 ends. If the load unit decision does not involve a format conversion (conditional block 615, "no" leg), then the processor loads the database object into memory according to the format specified for the database object (block 620). After block 620, method 600 ends.

If the load unit decision involves a format conversion (conditional block 615, "yes" leg), and if the database object is not stored in the unified persistence format in the persistence store (conditional block 625, "no" leg), then the processor rewrites the database object in the persistence store in a different persistence format when loading the database object into memory according to the converted format (block 635). After block 635, method 600 ends. It should be understood that while method 600 is described with respect to a database object, the steps of method 600 may be applied, alternatively or additionally, to one or more subcomponents of the database object.

Figure 7:
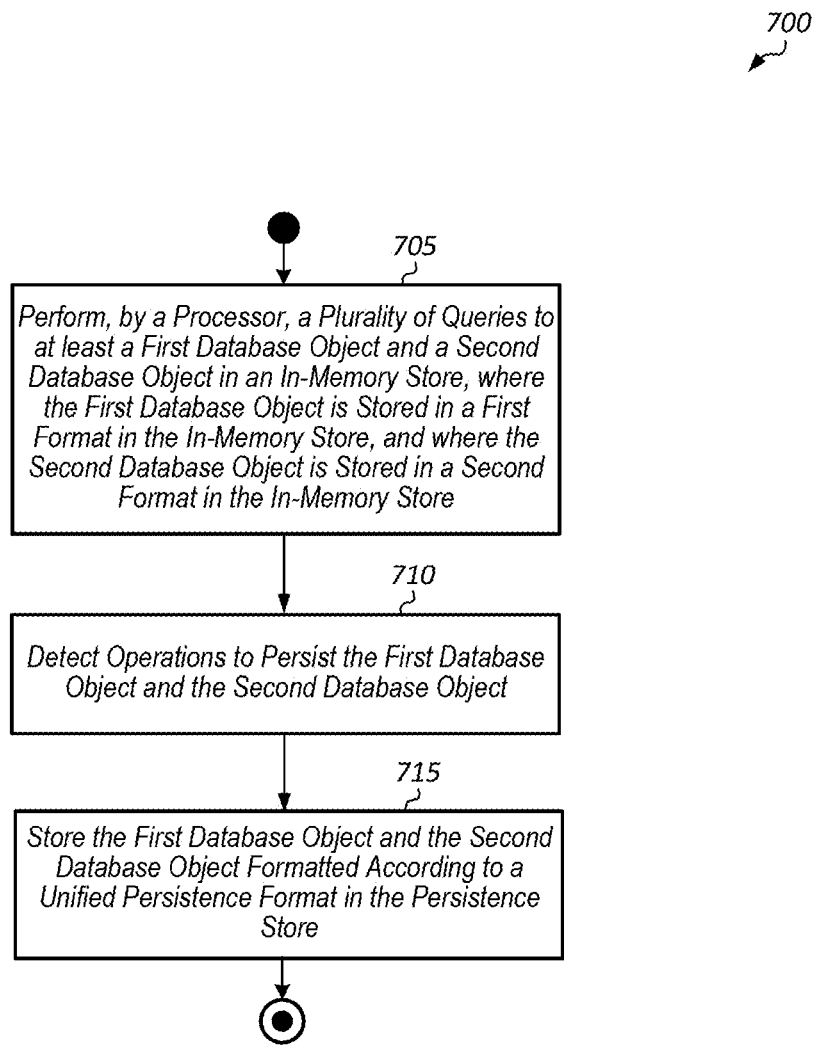
FIG. 7 illustrates an example of a process for storing database objects in a unified persistence format in a persistence store, in accordance with some example implementations of the current subject matter.

FIG. 7 illustrates a flowchart in accordance with at least some embodiments for implementing a process 700 for storing database objects in a unified persistence format in the persistence store. A processor performs a plurality of queries to at least a first database object and a second database object in an in-memory store, where the first database object is stored in a first format in the in-memory store, and wherein the second database object is stored in a second format in the in-memory store (block 705). In an example, the first format is a page-loadable format and the second format is a column-loadable format. The page-loadable format is defined such that there is a separate page chain for each of the data, dictionary, and index portions of the database object. The column-loadable format is defined so that the database object's data, dictionary, and index portions are serialized into a single page chain. In other examples, the first and second formats may be other types of formats.

Subsequent to performing the plurality of queries, a processor detects operations to persist the first database object and the second database object in a persistence store (block 710). It is noted that the operations may occur separately for the first database object and second database object. In other words, the save operations need not occur simultaneously, but may be separated by any duration of time. In response to detecting the save operations, the processor stores both the first database object and the second database object formatted according to a unified persistence format in the persistence store (block 715). For the unified persistence format, there is a separate page chain for each of the data, dictionary, and index portions of the database object. After block 715, method 700 ends.

Figure 8:
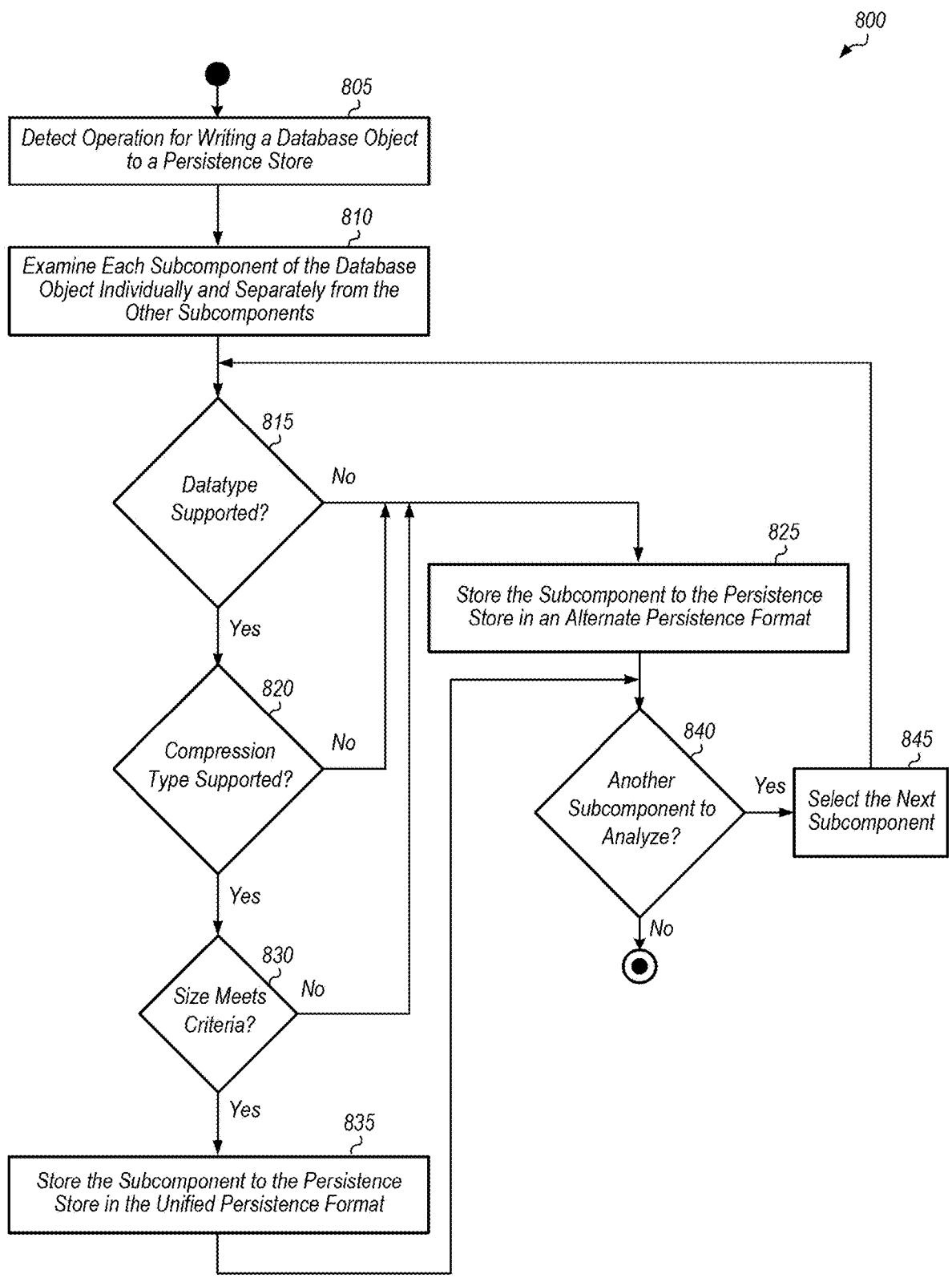
FIG. 8 illustrates an example of a process for storing database objects in a persistence store, in accordance with some example implementations of the current subject matter.

Turning now to FIG. 8, a flowchart in accordance with at least some embodiments for implementing a process 800 for storing database objects in a persistence store is shown. An operation for writing a database object to a persistence store is detected (block 805). Next, each subcomponent (e.g., data vector, dictionary, index vector) of the database object is examined individually and separately from the other subcomponents (block 810). If the datatype of the subcomponent is supported by the unified persistence format (conditional block 815, "yes" leg), then it is determined if the compression type of the subcomponent is supported by the unified persistence format (conditional block 820). In an example, datatypes supported by the unified persistence format may include at least binary, integer, and floating point datatypes. In other embodiments, other types of datatypes may be supported by the unified persistence format.

If the datatype of the subcomponent is not supported by the unified persistence format (conditional block 815, "not" leg), then the subcomponent is stored to the persistence store in an alternate persistence format (block 825). In an example, the alternate persistence format may be a serial persistence format. In another example, datatypes not supported by the unified persistence format may include at least text columns, multi-valued array columns, and geo-spatial columns. In other embodiments, the datatypes that are not supported by the unified persistence format may include one or more other datatypes and/or may exclude one or more of the datatypes listed above. In a further example, the datatypes of text columns, multi-valued array columns, and geo-spatial columns may be supported by the unified persistence format.

If the compression type of the subcomponent is supported by the unified persistence format (conditional block 820, "yes" leg), then it is determined if the size of the subcomponent meets criteria for benefiting from the unified persistence format (conditional block 830). In an example, cluster encoding, prefix encoding, sparse encoding, and Golomb encoding are supported by the unified persistence format. In other examples, other types of compression schemes may be supported by the unified persistence format. If the compression type of the subcomponent is not supported by the unified persistence format (conditional block 820, "no" leg), then the subcomponent is stored to the persistence store in an alternate persistence format (block 825). In an example, linear run-length encoding and Simple-8 compression schemes are not supported by the unified persistence format. In other examples, other types of compression schemes may not be supported by the unified persistence format. It is noted that block 825 may also include storing metadata indicating that the subcomponent is stored in the alternate persistence format in the persistence store. Alternatively, the storing of metadata may occur at the end of method 800 when all subcomponents have been persisted in the persistence store.

If the size of the subcomponent meets criteria for benefiting from the unified persistence format (conditional block 830, "yes" leg), then the subcomponent is stored to the persistence store in the unified persistence format (block 835). In an example, if the size of the subcomponent is greater than the size of a page for the given subcomponent, then the subcomponent would benefit from the unified persistence format. It is noted that block 835 may also include storing metadata indicating that the subcomponent is stored in the unified persistence format in the persistence store. If the size of the subcomponent does not meet the criteria for benefiting from the unified persistence format (conditional block 830, "no" leg), then the subcomponent is stored to the persistence store in an alternate persistence format (block 825). In an example, if the size of the subcomponent is less than the size of a page for the given subcomponent, then the subcomponent would not benefit from the unified persistence format. If there are other subcomponents to analyze (conditional block 840, "yes" leg), then the next subcomponent is selected (block 845), and then method 800 returns to conditional block 815. If there are no other subcomponents to analyze (conditional block 840, "no" leg), then method 800 ends. It should be understood that the conditional blocks of method 800 may be performed in a different order than is shown in FIG. 8.

In some implementations, the current subject matter may be configured to be implemented in a system 900, as shown in FIG. 9A. The system 900 may include a processor 910, a memory 920, a storage device 930, and an input/output device 940. Each of the components 910, 920, 930 and 940 may be interconnected using a system bus 950. The processor 910 may be configured to process instructions for execution within the system 900. In some implementations, the processor 910 may be a single-threaded processor. In alternate implementations, the processor 910 may be a multi-threaded processor. The processor 910 may be further configured to process instructions stored in the memory 920 or on the storage device 930, including receiving or sending information through the input/output device 940. The memory 920 may store information within the system 900. In some implementations, the memory 920 may be a computer-readable medium. In alternate implementations, the memory 920 may be a volatile memory unit. In yet some implementations, the memory 920 may be a non-volatile memory unit. The storage device 930 may be capable of providing mass storage for the system 900. In some implementations, the storage device 930 may be a computer-readable medium. In alternate implementations, the storage device 930 may be a floppy disk device, a hard disk device, an optical disk device, a tape device, non-volatile solid state memory, or any other type of storage device. The input/output device 940 may be configured to provide input/output operations for the system 900. In some implementations, the input/output device 940 may include a keyboard and/or pointing device. In alternate implementations, the input/output device 940 may include a display unit for displaying graphical user interfaces.

Figure 9B:
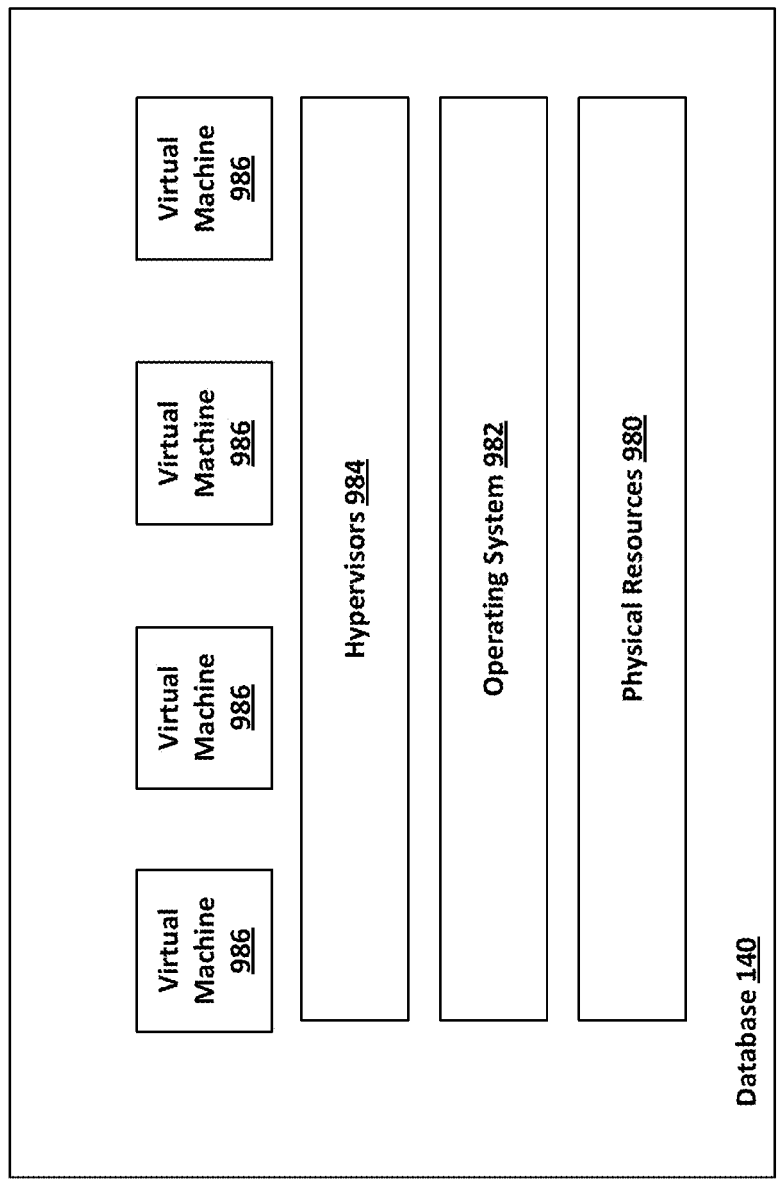
FIG. 9B depicts another example of a system, in accordance with some example implementations of the current subject matter.

FIG. 9B depicts an example implementation of the database 140, which provides database services. The database 140 may include physical resources 980, such as at least one hardware servers, at least one storage, at least one memory, at least one network interface, and the like. The database 140 may also include infrastructure, as noted above, which may include at least one operating systems 982 for the physical resources and at least one hypervisor 984 (which may create and run at least one virtual machine 986). For example, each multitenant application may be run on a corresponding virtual machine.

Figure 10:
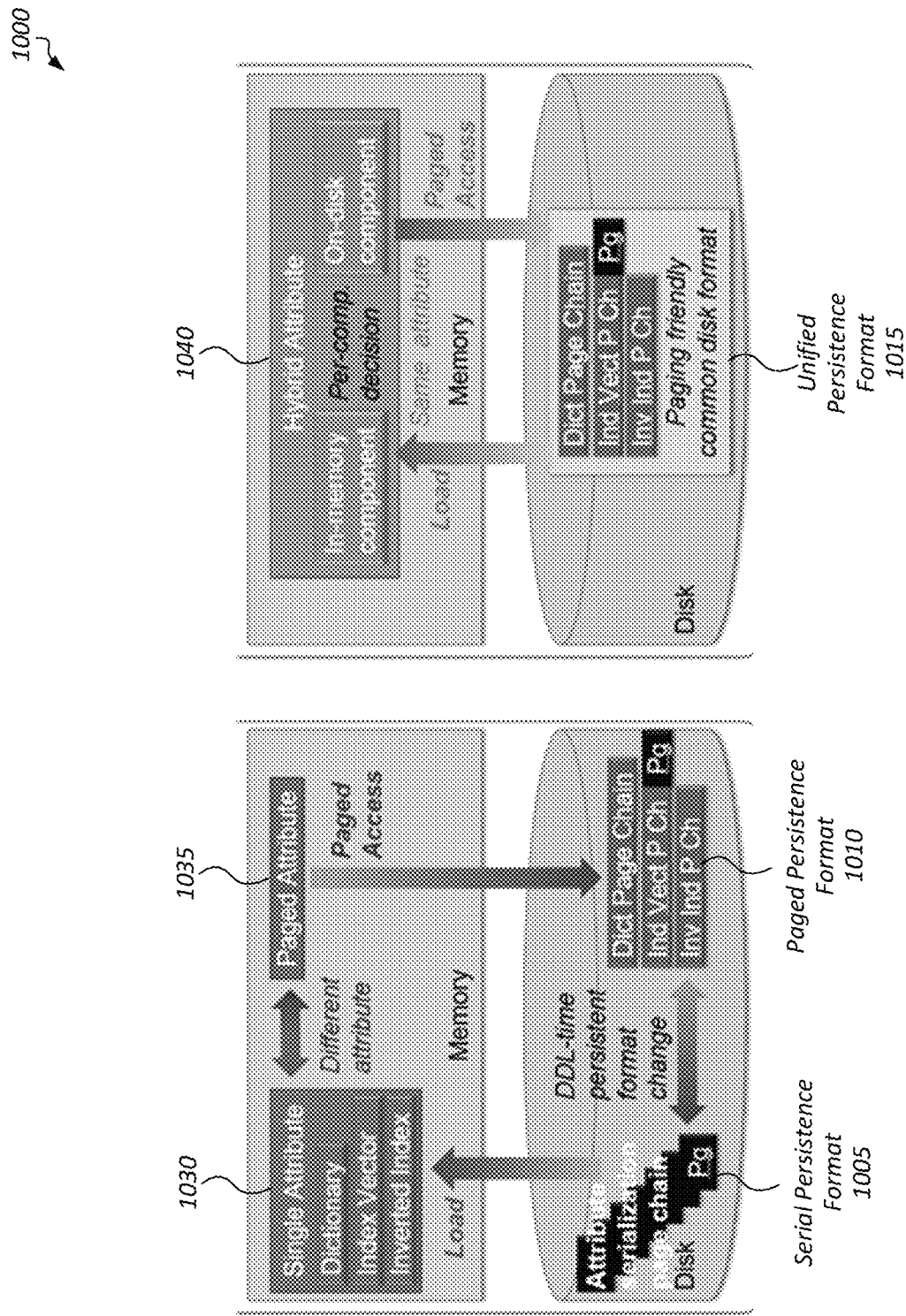
FIG. 10 illustrates a diagram of different persistence formats, in accordance with some example implementations of the current subject matter.

Turning now to FIG. 10, a diagram 1000 of different persistence formats is shown. In an example shown on the left-side of FIG. 10, a column-loadable database object is stored as a serial page chain in serial persistence format 1005, with a single attribute 1030 in the in-memory store. For page-loadable database objects having an in-memory paged attribute 1035, there are separate page chains for each component in the paged persistence format 1010. In an example, the database object components include the dictionary, inverted index, and data page chains. On the left-side of FIG. 10, when converting between the column loadable and page loadable formats, the persistence is rewritten.

However, on the right-side of FIG. 10, with database objects persisted according to the unified persistence format 1015, the persistence does not need to be rewritten when performing a format conversion. For a database stored in persistence storage according to unified persistence format 1015, metadata associated with the database object undergoing the format conversion is uploaded to the in-memory store. This uploading of metadata allows the format conversion to occur without having to rewrite the persistence. The in-memory database object has a hybrid attribute 1040 which is the same attribute for either a column-loadable or a page-loadable database object.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second and the like can, in some situations, relate to an order; as used in a document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include program instructions (i.e., machine instructions) for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives program instructions as a machine-readable signal. The term "machine-readable signal" refers to any signal used to provide machine instructions and/or data to a programmable processor. The machine-readable medium can store such program instructions non-transitorily, such as for example as would a non-transient solid state memory or a magnetic hard drive or any equivalent storage medium. The machine-readable medium can alternatively or additionally store such machine instructions in a transient manner, such as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A method performed by a database system, comprising: detecting an operation to move a first database object from an in-memory store to a persistence store, wherein the first database object is in a first format in the in-memory store, and wherein the first database object comprises a plurality of subcomponents; examining each subcomponent of the first database object individually and separately from other subcomponents of the plurality of subcomponents; responsive to determining that a first subcomponent of the plurality of subcomponents has a datatype and a compression type supported by a unified persistence format, storing the first subcomponent in the unified persistence format in the persistence store; and responsive to determining that a second subcomponent of the plurality of subcomponents has either a datatype or a compression type which is not supported by the unified persistence format, storing the second subcomponent in a serial persistence format in the persistence store.

Example 2: The method of Example 1, further comprising: detecting an operation to move a second database object from the in-memory store to the persistence store, wherein the second database object is in a second format in the in-memory store, and wherein the second format is different from the first format; and responsive to determining that both the first database object and the second database object meet one or more conditions, storing both the first database object and the second database object in a unified persistence format in the persistence store, wherein the unified persistence format enables format conversion without requiring a persistence rewrite.

Example 3: The method of any of Examples 1-2, wherein the first format is a column-loadable format, and wherein the second format is a page-loadable format.

Example 4: The method of any of Examples 1-3, further comprising loading a third database object from the persistence store to the in-memory store in either the column-loadable format or the page-loadable format without causing a rewrite of the third database object in the persistence store responsive to determining that the third database object is stored in the unified persistence format.

Example 5: The method of any of Examples 1-4, further comprising determining a load format of the third database object based at least on memory utilization of the in-memory store and based at least on an access frequency of the third database object.

Example 6: The method of any of Examples 1-5, further comprising loading a first subcomponent of the third database object from the persistence store to the in-memory store in the column-loadable format and loading a second subcomponent of the third database object from the persistence store to the in-memory store in the page-loadable format responsive to determining that the third database object is stored in the unified persistence format.

Example 7: The method of any of Examples 1-6, wherein for the page-loadable format, only pages relevant to a corresponding query are loaded into the in-memory store.

Example 8: The method of any of Examples 1-7, wherein for the column-loadable format, an entirety of a corresponding database object is loaded into the in-memory store.

Example 9: The method of any of Examples 1-8, wherein the column-loadable format comprises having a data subcomponent, a dictionary subcomponent, and an index subcomponent of a corresponding database object serialized together into a single page chain.

Example 10: The method of any of Examples 1-9, wherein the page-loadable format comprises having a separate page chain for each of the data subcomponent, the dictionary subcomponent, and the index subcomponent of the first database object.

Example 11: The method of any of Examples 1-10, wherein the unified persistence format comprises having a separate page chain for each of the data subcomponent, the dictionary subcomponent, and the index subcomponent of the first database object.

Example 12: The method of any of Examples 1-11, wherein a first condition, of the one or more conditions, comprises a datatype of a first subcomponent of the first database object being supported by the unified persistence format.

Example 13: The method of any of Examples 1-12, wherein a second condition, of the one or more conditions, comprises a type of compression used to compress a first subcomponent of the first database object being supported by the unified persistence format.

Example 14: The method of any of Examples 1-13, further comprising storing a second subcomponent of the first database object in an alternate persistence format responsive to determining that a type of compression used to compress the second subcomponent is not supported by the unified persistence format.

Example 15: A system, comprising: at least one processor; and at least one memory including program instructions which when executed by the at least one processor causes operations comprising: detecting an operation to move a first database object from an in-memory store to a persistence store, wherein the first database object is in a first format in the in-memory store, and wherein the first database object comprises a plurality of subcomponents; examining each subcomponent of the first database object individually and separately from other subcomponents of the plurality of subcomponents; responsive to determining that a first subcomponent of the plurality of subcomponents has a datatype and a compression type supported by a unified persistence format, storing the first subcomponent in the unified persistence format in the persistence store; and responsive to determining that a second subcomponent of the plurality of subcomponents has either a datatype or a compression type which is not supported by the unified persistence format, storing the second subcomponent in a serial persistence format in the persistence store.

Example 16: The system of Example 15, wherein the program instructions are further executable by the at least one processor to cause operations comprising: detecting an operation to move a second database object from the in-memory store to the persistence store, wherein the second database object is in a second format in the in-memory store, and wherein the second format is different from the first format; and responsive to determining that both the first database object and the second database object meet one or more conditions, storing both the first database object and the second database object in a unified persistence format in the persistence store, wherein the unified persistence format enables format conversion without requiring a persistence rewrite.

Example 17: The system of any of Examples 15-16, wherein the first format is a column-loadable format, and wherein the second format is a page-loadable format.

Example 18: The system of any of Examples 15-17, wherein the program instructions are further executable by the at least one processor to cause operations comprising loading a third database object from the persistence store to the in-memory store in either the column-loadable format or the page-loadable format without causing a rewrite of the third database object in the persistence store responsive to determining that the third database object is stored in the unified persistence format.

Example 19: The system of any of Examples 15-18, wherein the program instructions are further executable by the at least one processor to cause operations comprising determining a load format of the third database object based at least on memory utilization of the in-memory store and based at least on an access frequency of the third database object.

Example 20: A non-transitory computer readable medium storing instructions, which when executed by at least one data processor, cause operations comprising: detecting an operation to move a first database object from an in-memory store to a persistence store, wherein the first database object is in a first format in the in-memory store, and wherein the first database object comprises a plurality of subcomponents; examining each subcomponent of the first database object individually and separately from other subcomponents of the plurality of subcomponents; responsive to determining that a first subcomponent of the plurality of subcomponents has a datatype and a compression type supported by a unified persistence format, storing the first subcomponent in the unified persistence format in the persistence store; and responsive to determining that a second subcomponent of the plurality of subcomponents has either a datatype or a compression type which is not supported by the unified persistence format, storing the second subcomponent in a serial persistence format in the persistence store.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A method performed by a database system, comprising:
    detecting an operation to move a first database object from an in-memory store to a persistence store, wherein the first database object is in a first format in the in-memory store, and wherein the first database object comprises a plurality of subcomponents;
    examining each subcomponent of the first database object individually and separately from other subcomponents of the plurality of subcomponents;
    responsive to determining that a first subcomponent of the plurality of subcomponents has a datatype and a compression type supported by a unified persistence format, storing the first subcomponent in the unified persistence format in the persistence store; and
    responsive to determining that a second subcomponent of the plurality of subcomponents has either a datatype or a compression type which is not supported by the unified persistence format, storing the second subcomponent in a serial persistence format in the persistence store.

2. The method of claim 1, further comprising:
    detecting an operation to move a second database object from the in-memory store to the persistence store, wherein the second database object is in a second format in the in-memory store, and wherein the second format is different from the first format; and
    responsive to determining that both the first database object and the second database object meet one or more conditions, storing both the first database object and the second database object in the unified persistence format in the persistence store, wherein the unified persistence format enables format conversion without requiring a persistence rewrite.

3. The method of claim 2, wherein the first format is a column-loadable format, and wherein the second format is a page-loadable format.

4. The method of claim 3, further comprising loading a third database object from the persistence store to the in-memory store in either the column-loadable format or the page-loadable format without causing a rewrite of the third database object in the persistence store responsive to determining that the third database object is stored in the unified persistence format.

5. The method of claim 4, further comprising determining a load format of the third database object based at least on memory utilization of the in-memory store and based at least on an access frequency of the third database object.

6. The method of claim 4, further comprising loading a first subcomponent of the third database object from the persistence store to the in-memory store in the column-loadable format and loading a second subcomponent of the third database object from the persistence store to the in-memory store in the page-loadable format responsive to determining that the third database object is stored in the unified persistence format.

7. The method of claim 4, wherein for the page-loadable format, only pages relevant to a corresponding query are loaded into the in-memory store.

8. The method of claim 7, wherein for the column-loadable format, an entirety of a corresponding database object is loaded into the in-memory store.

9. The method of claim 8, wherein the column-loadable format comprises having a data subcomponent, a dictionary subcomponent, and an index subcomponent of a corresponding database object serialized together into a single page chain.

10. The method of claim 9, wherein the page-loadable format comprises having a separate page chain for each of the data subcomponent, the dictionary subcomponent, and the index subcomponent of the first database object.

11. The method of claim 10, wherein the unified persistence format comprises having a separate page chain for each of the data subcomponent, the dictionary subcomponent, and the index subcomponent of the first database object.

12. The method of claim 11, wherein a first condition, of the one or more conditions, comprises a datatype of a first subcomponent of the first database object being supported by the unified persistence format.

13. The method of claim 12, wherein a second condition, of the one or more conditions, comprises a type of compression used to compress a first subcomponent of the first database object being supported by the unified persistence format.

14. The method of claim 13, further comprising storing a second subcomponent of the first database object in an alternate persistence format responsive to determining that a type of compression used to compress the second subcomponent is not supported by the unified persistence format.

15. A system, comprising:
    at least one processor; and
    at least one memory including program instructions which when executed by the at least one processor causes operations comprising:
        detecting an operation to move a first database object from an in-memory store to a persistence store, wherein the first database object is in a first format in the in-memory store, and wherein the first database object comprises a plurality of subcomponents;
        examining each subcomponent of the first database object individually and separately from other subcomponents of the plurality of subcomponents;
        responsive to determining that a first subcomponent of the plurality of subcomponents has a datatype and a compression type supported by a unified persistence format, storing the first subcomponent in the unified persistence format in the persistence store; and
        responsive to determining that a second subcomponent of the plurality of subcomponents has either a datatype or a compression type which is not supported by the unified persistence format, storing the second subcomponent in a serial persistence format in the persistence store.

16. The system of claim 15, wherein the program instructions are further executable by the at least one processor to cause operations comprising:
    detecting an operation to move a second database object from the in-memory store to the persistence store, wherein the second database object is in a second format in the in-memory store, and wherein the second format is different from the first format; and
    responsive to determining that both the first database object and the second database object meet one or more conditions, storing both the first database object and the second database object in the unified persistence format in the persistence store, wherein the unified persistence format enables format conversion without requiring a persistence rewrite.

17. The system of claim 16, wherein the first format is a column-loadable format, and wherein the second format is a page-loadable format.

18. The system of claim 17, wherein the program instructions are further executable by the at least one processor to cause operations comprising loading a third database object from the persistence store to the in-memory store in either the column-loadable format or the page-loadable format without causing a rewrite of the third database object in the persistence store responsive to determining that the third database object is stored in the unified persistence format.

19. The system of claim 18, wherein the program instructions are further executable by the at least one processor to cause operations comprising determining a load format of the third database object based at least on memory utilization of the in-memory store and based at least on an access frequency of the third database object.

20. A non-transitory computer readable medium storing instructions, which when executed by at least one data processor, cause operations comprising:
    detecting an operation to move a first database object from an in-memory store to a persistence store, wherein the first database object is in a first format in the in-memory store, and wherein the first database object comprises a plurality of subcomponents;
    examining each subcomponent of the first database object individually and separately from other subcomponents of the plurality of subcomponents;
    responsive to determining that a first subcomponent of the plurality of subcomponents has a datatype and a compression type supported by a unified persistence format, storing the first subcomponent in the unified persistence format in the persistence store; and
    responsive to determining that a second subcomponent of the plurality of subcomponents has either a datatype or a compression type which is not supported by the unified persistence format, storing the second subcomponent in a serial persistence format in the persistence store.

* * * * *